(12) United States Patent
Kim et al.

(10) Patent No.: US 12,706,344 B2
(45) Date of Patent: Aug. 11, 2026

(54) BATTERY MODULE, AND BATTERY PACK AND VEHICLE COMPRISING BATTERY MODULE

(71) Applicant: LG Energy Solution, Ltd., Seoul (KR)

(72) Inventors: Seung-Joon Kim, Daejeon (KR); Young-Bum Cho, Daejeon (KR); Jin-Hak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 571 days.

(21) Appl. No.: 17/765,241

(22) PCT Filed: Nov. 11, 2020

(86) PCT No.: PCT/KR2020/015825

§ 371 (c)(1),
(2) Date: Mar. 30, 2022

(87) PCT Pub. No.: WO2021/096231

PCT Pub. Date: May 20, 2021

(65) Prior Publication Data

US 2022/0285777 A1 Sep. 8, 2022

(30) Foreign Application Priority Data

Nov. 11, 2019 (KR) ........................ 10-2019-0143743

(51) Int. Cl.
*H01M 50/258* (2021.01)
*H01M 50/244* (2021.01)
*H01M 50/249* (2021.01)

(52) U.S. Cl.
CPC ....... *H01M 50/258* (2021.01); *H01M 50/244* (2021.01); *H01M 50/249* (2021.01)

(58) Field of Classification Search
CPC ................................................. H01M 2220/20
See application file for complete search history.

(56) References Cited

U.S. PATENT DOCUMENTS

2007/0141457 A1* 6/2007 Amagai .............. H01M 50/557 429/162
2007/0224498 A1 9/2007 Kim et al.
2014/0045027 A1 2/2014 Suzuki
2014/0177141 A1 6/2014 Cao
2015/0303425 A1 10/2015 Kong
(Continued)

FOREIGN PATENT DOCUMENTS

CN 104466254 A 3/2015
JP 2006172994 A 6/2006
(Continued)

OTHER PUBLICATIONS

International Search Report for Application No. PCT/KR2020/015825 mailed Feb. 23, 2021, 2 pages.
(Continued)

*Primary Examiner* — Matthew T Martin
*Assistant Examiner* — Ankith R Sripathi
(74) *Attorney, Agent, or Firm* — Lerner David LLP

(57) ABSTRACT

Disclosed is a battery module, which includes a plurality of battery cells stacked on each other; and a plurality of adhesive members respectively disposed between the plurality of battery cells and configured to be removable according to a user manipulation.

5 Claims, 6 Drawing Sheets

(56) References Cited

U.S. PATENT DOCUMENTS

| | | | | |
|---|---|---|---|---|
| 2016/0002514 | A1* | 1/2016 | Determan | B32B 25/045 428/354 |
| 2016/0304750 | A1* | 10/2016 | Gao | C09J 7/25 |
| 2019/0252653 | A1* | 8/2019 | Han | H01M 50/244 |

FOREIGN PATENT DOCUMENTS

| | | | |
|---|---|---|---|
| JP | 20120069408 | A | 4/2012 |
| JP | 2012-119131 | A | 6/2012 |
| JP | 2012212609 | A | 11/2012 |
| JP | 2017075228 | A | 4/2017 |
| JP | 2018-037358 | A | 3/2018 |
| JP | 2018-081885 | A | 5/2018 |
| KR | 20080042965 | A | 5/2008 |
| KR | 100942986 | B1 | 2/2010 |
| KR | 20110102480 | A | 9/2011 |
| KR | 20140064418 | A | 5/2014 |

OTHER PUBLICATIONS

Extended European Search Report including Written Opinion for Application No. 20888681.2 dated Nov. 23, 2022, pp. 1-8.

* cited by examiner

BATTERY MODULE, AND BATTERY PACK AND VEHICLE COMPRISING BATTERY MODULE

CROSS-REFERENCE TO RELATED APPLICATIONS TECHNICAL FIELD

This application is a national phase entry under 35 U.S.C. § 371 of International Application No. PCT/KR2020/015825, filed on Nov. 11, 2020, published in Korean, which claims priority to Korean Patent Application No. 10-2019-0143743, filed on Nov. 11, 2019, the disclosures of which are hereby incorporated herein by reference.

TECHNICAL FIELD

The present disclosure relates to a battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

In a conventional battery module, a plurality of battery cells are stacked on each other to be electrically connected, and an adhesive or the like is applied to facing surfaces of the plurality of battery cells to be fixed to each other for more stable fixation.

However, in the conventional battery module, when it is required later to replace some battery cells replaced due to defects or discharges of some of the battery cells, it is difficult to separate the battery cells fixed to each other.

In the conventional battery module, in order to separate the battery cells, the adhesive applied to the facing surfaces of the battery cells must be removed. However, the removal work generally uses a remover containing harmful substances and requires a long working time.

Moreover, in the conventional battery module, there is a high risk of damage to the battery cells during the removal work, and residues are frequently generated between the battery cells during the removal work.

Therefore, there is a need to develop a battery module in which desired battery cells may be separated more conveniently when it is required to replace at least some battery cells among the battery cells stacked and fixed to each other, and to develop a battery pack and a vehicle including the battery module.

DISCLOSURE

Technical Problem

Therefore, the present disclosure is directed to providing a battery module in which desired battery cells may be separated more conveniently when it is required to replace at least some battery cells among battery cells stacked and fixed to each other, and a battery pack and a vehicle including the battery module.

In addition, the present disclosure is also directed to providing a battery module in which locations of battery cells stacked and fixed to each other may be easily changed or all battery cells may be easily rearranged, and a battery pack and a vehicle including the battery module.

Technical Solution

In one aspect of the present disclosure, there is provided a battery module, comprising: a plurality of battery cells stacked on each other; and a plurality of adhesive members respectively disposed between the plurality of battery cells and configured to be removable according to a user manipulation.

The plurality of adhesive members may be provided to both ends of the plurality of battery cells in a longitudinal direction.

Each of the plurality of battery cells may include an electrode assembly; a battery case having a case body configured to accommodate the electrode assembly and a case terrace configured to extend from the case body along the longitudinal direction of the battery cells; and a pair of electrode leads configured to protrude from the case terrace of the battery case and electrically connected to the electrode assembly, and a portion of the plurality of adhesive members may be disposed at both ends of the case body in the longitudinal direction of the plurality of battery cells.

The remaining portion of the plurality of adhesive members may be disposed in a space between the case terraces of the plurality of battery cells.

The plurality of adhesive members may be removable out of the case body in the longitudinal direction of the plurality of battery cells according to the user manipulation.

The plurality of adhesive members may move out of the case body while sliding along the longitudinal direction of the plurality of battery cells according to the user manipulation.

Each of the plurality of adhesive members may include an adhesion portion disposed at both ends of the case body in the longitudinal direction of the plurality of battery cells; and a user manipulation portion configured to extend from the adhesion portion and disposed between the case terraces.

The adhesion portion may be provided as a double-sided tape.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Advantageous Effects

According to various embodiments as above, it is possible to provide a battery module in which desired battery cells may be separated more conveniently when it is required to replace at least some battery cells among battery cells stacked and fixed to each other, and a battery pack and a vehicle including the battery module.

In addition, according to various embodiments as above, it is possible to provide a battery module in which locations of battery cells stacked and fixed to each other may be easily changed or all battery cells may be easily rearranged, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a diagram for illustrating an adhesive member of the battery module of

FIG. 2.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
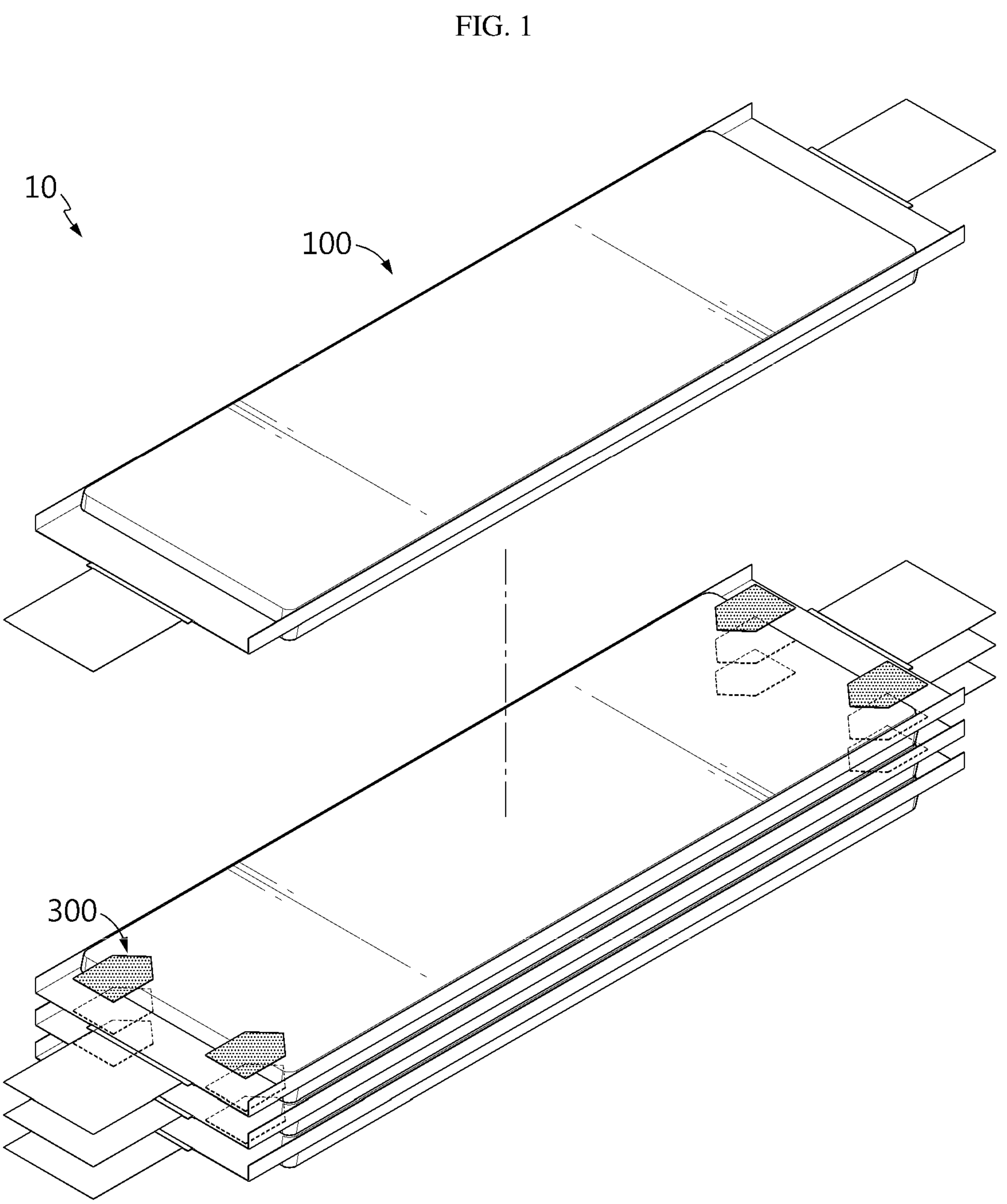
FIG. 1 is a diagram for illustrating a battery module according to an embodiment of the present disclosure.
Figure 2:
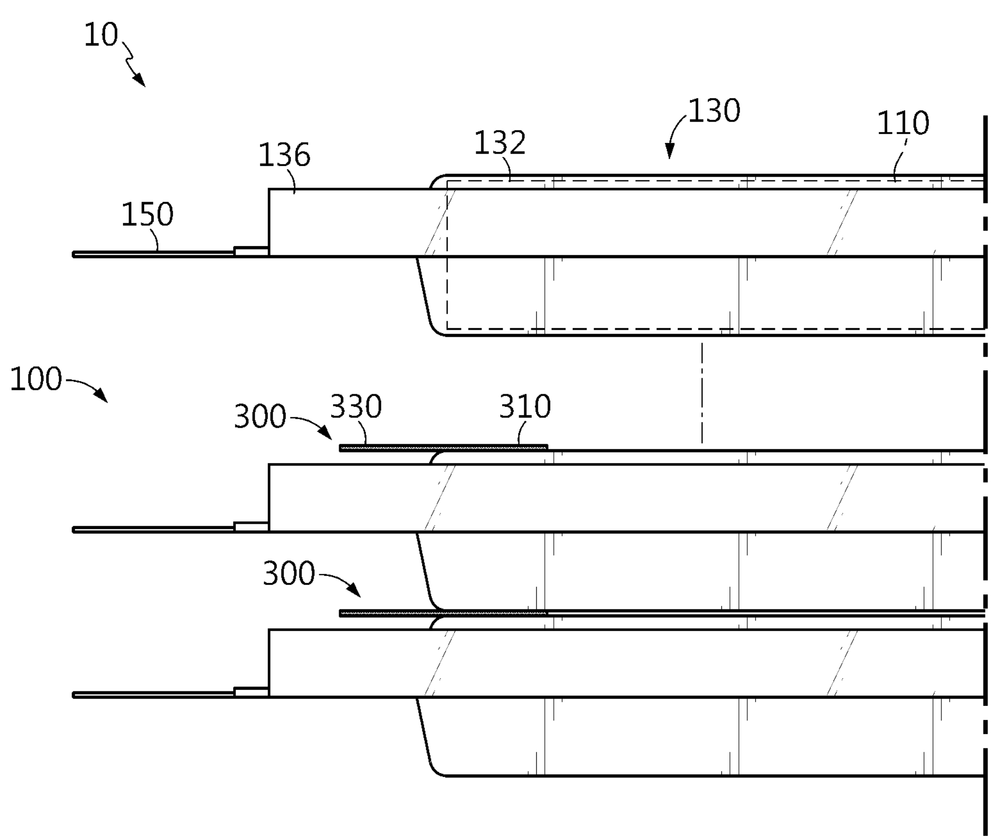
FIG. 2 is a side view showing a main part of the battery module of FIG. 1.
Figure 3:
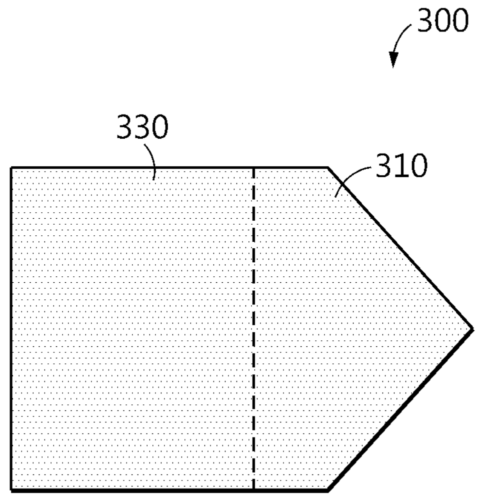
Figure 4:
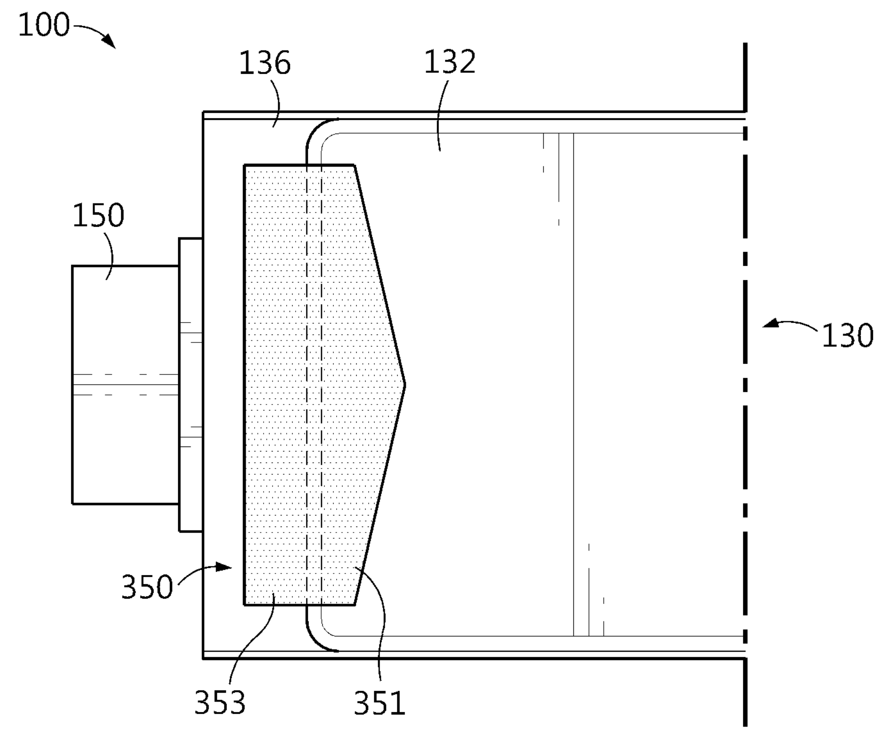
FIG. 4 is a diagram for illustrating an adhesive member of the battery module of FIG. 2 according to another embodiment.

FIG. 1 is a diagram for illustrating a battery module according to an embodiment of the present disclosure, FIG. 2 is a side view showing a main part of the battery module of FIG. 1, FIG. 3 is a diagram for illustrating an adhesive member of the battery module of FIG. 2, and FIG. 4 is a diagram for illustrating an adhesive member of the battery module of FIG. 2 according to another embodiment.

Referring to FIGS. 1 to 4, a battery module 10 may include a battery cell 100 and an adhesive member 300.

The battery cell 100 is a secondary battery and may be provided as a pouch-type secondary battery, a rectangular secondary battery or a cylindrical secondary battery. Hereinafter, in this embodiment, it will be described that the battery cell 100 is provided as a pouch-type secondary battery.

The battery cell 100 may be provided in plural.

The plurality of battery cells 100 may be stacked on each other to be electrically connected to each other. Here, the plurality of battery cells 100 may be bonded to each other by means of an adhesive member 100, explained later, for more stable fixation, thereby being more stably stacked. Although not shown, the plurality of battery cells 100 may be accommodated in a structure such as a module case that is a component of the battery module 10.

Each of the plurality of battery cells 100 may include an electrode assembly 110, a battery case 130, and an electrode lead 150.

The electrode assembly 110 may include a positive electrode plate, a negative electrode plate, a separator, and the like. The electrode assembly 110 is well known in the art and thus will not be described in detail here.

The battery case 130 accommodates the electrode assembly 110, and may accommodate a pair of electrode leads 150, explained later, so that the pair of electrode leads 150 protrude out of the battery case 130 at least partially.

The battery case 130 may include a case body 132 and a case terrace 136.

The case body 132 may accommodate the electrode assembly 110. To this end, an accommodation space capable of accommodating the electrode assembly 110 may be provided in the case body 132.

The case terrace 136 extends from both ends of the case body 132 and may extend from the case body 132 along a longitudinal direction of the battery cells 100.

The case terrace 136 may have a height lower than that of the case body 132 in a stacking direction of the battery cells 100. Accordingly, when the battery cells 100 are stacked, a predetermined space may be provided between the case terraces 136 in the stacking direction.

The electrode lead 150 may be provided in a pair.

The pair of electrode leads 150 are electrically connected to the electrode assembly 110 and may protrude from the case terrace 136 of the battery case 130.

The adhesive member 300 is disposed between the plurality of battery cells 100, and when the plurality of battery cells 100 are stacked, the adhesive member 300 may be bonded to the plurality of battery cells 100 to more stably fix the plurality of battery cells 100.

The adhesive member 300 may be provided in plural.

The plurality of adhesive members 300 may improve insulation of the plurality of battery cells 100 and temperature variation of the plurality of battery cells 100 between the plurality of battery cells 100.

The plurality of adhesive members 300 may be respectively disposed between the plurality of battery cells 100, and may be provided to be removable from the plurality of battery cells 100 according to a user manipulation.

The plurality of adhesive members 300 may be provided at both ends of the plurality of battery cells 100 in a longitudinal direction. Specifically, a portion 310 of the plurality of adhesive members 300 may be disposed at both ends of the case body 132 in the longitudinal direction of the plurality of battery cells 100, and the remaining portion 330 of the plurality of adhesive members 300 may be disposed in a space between the case terraces 136 of the plurality of battery cells 100.

The plurality of adhesive members 300 may be provided to be detachable out of the case body 132 in the longitudinal direction of the plurality of battery cells 100 according to the user manipulation. Specifically, the plurality of adhesive members 300 may move out of the case body 132 while sliding along the longitudinal direction of the plurality of battery cells 100 according to the user manipulation.

Hereinafter, the plurality of adhesive members 300 according to this embodiment will be described in more detail.

Each of the plurality of adhesive members 300 may include an adhesion portion 310 and a user manipulation portion 330.

The adhesion portions 310 may be disposed at both ends of the case body 132 of the battery case 130 in the longitudinal direction of the plurality of battery cells 100. In addition, the adhesion portions 310 may be disposed at both ends of the case body 132 to be spaced apart from each other by a predetermined distance along a width direction of the plurality of battery cells 100.

The adhesion portion 310 may be provided as a double-sided tape, and when the plurality of battery cells 100 are stacked, the adhesion portion 310 may be adhered to the case bodies 132 of the battery cases 130 of the battery cells 100 facing each other in the stacking direction. In this embodiment, since the adhesion portion 310 is provided as a double-sided tape, non-transferring or agglomeration may not occur.

The adhesion portion 310 may be provided to be inclined in an approximately triangular shape toward the center of the case body 132 of the battery case 130 of the battery cell 100. Accordingly, when the adhesive member 300 is removed, the adhesive member 300 may be more easily detached from the case body 132.

The user manipulation portion 330 extends from the adhesion portion 310 and may be disposed in a space between the case terraces 136 of the battery cases 130 of the plurality of battery cells 100 in the stacking direction of the plurality of battery cells 100. Accordingly, when the adhesive member 300 is removed, the user manipulation for removing the adhesive member 330 may be performed more easily.

Meanwhile, as shown in FIG. 1, the adhesive member 350 may be provided at each of both ends of the battery case 130 of the battery cell 100. The adhesive member 350 may include an adhesion portion 310 bonded to both ends of the case body 132 of the battery case 130 and removed from the case body 132 according to the user manipulation, and a user manipulation portion 353 extending from the adhesion portion 310 and provided for the user manipulation.

Figure 5:
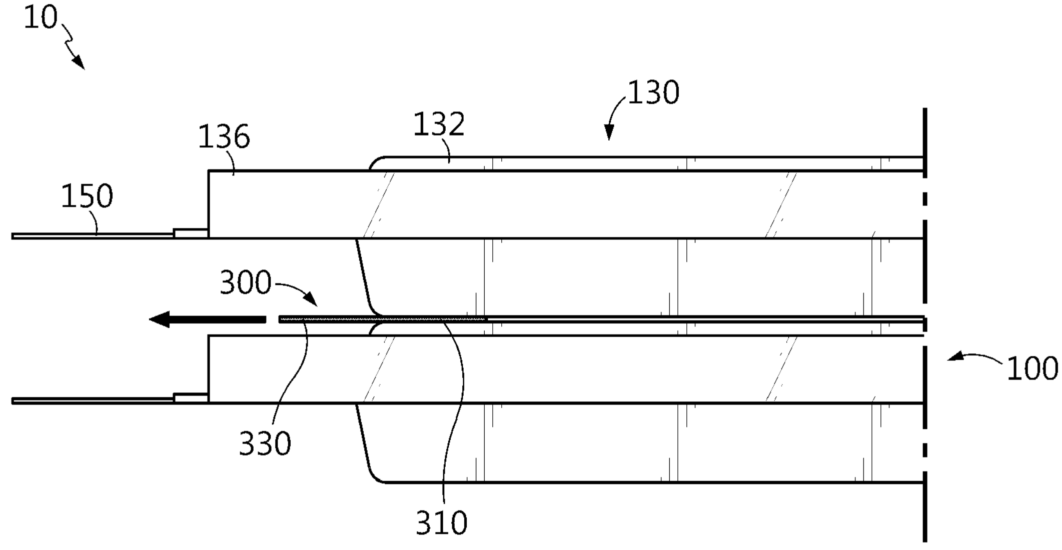
FIGS. 5 and 6 are diagrams for illustrating that the adhesive member of the battery module of FIG. 1 is removed.
Figure 6:
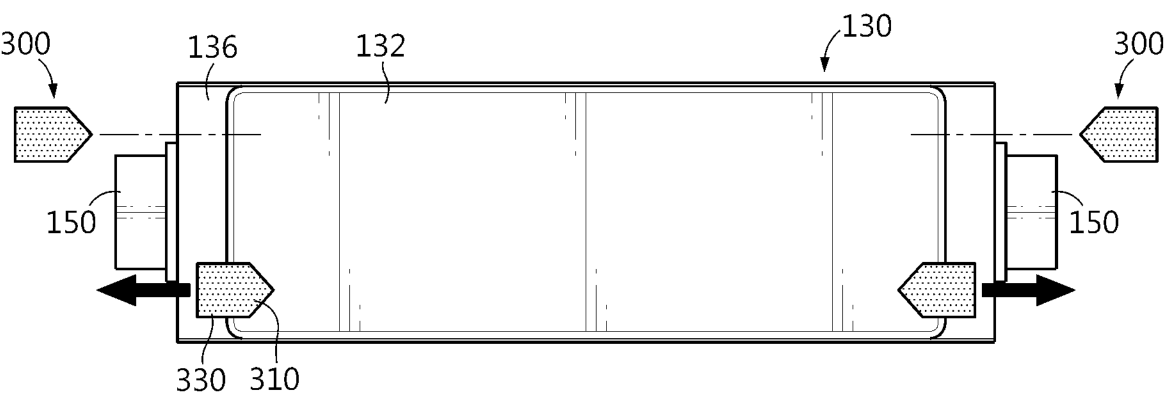

FIGS. 5 and 6 are diagrams for illustrating that the adhesive member of the battery module of FIG. 1 is removed.

Referring to FIGS. 5 and 6, when the battery module 10 is in use or manufacture, at least one battery cell 100 may be defected or discharged among the battery cells 100. Accordingly, it may be required to replace the defective or discharged battery cell 100.

In this embodiment, a user such as an operator may more conveniently release the fixed state between the battery cell 100 to be replaced and the remaining battery cell 100*s* by performing a user manipulation to the adhesive members 300 of the battery cell 100 to be replaced, among the battery cells 100 of the battery module 10.

Specifically, the user or the like may more conveniently remove the adhesive members 300 out of the battery cell 100 by pulling out the user manipulation portions 330 of the adhesive members 300 attached to the battery cell 100 to be replaced.

That is, in this embodiment, the user or the like may more conveniently remove the adhesive members 300 from the battery cells 100 by a simple manipulation on the user manipulation portions 330 of the adhesive members 300.

Accordingly, in this embodiment, when some battery cells 100 are removed among the battery cells 100 during manufacture or use, the work for separating the battery cell 100 to be replaced may be remarkably simplified, and the working time may also be significantly reduced.

Moreover, since the adhesion portion 310 of the adhesive member 300 is in contact with only the edges of both ends of the case body 132 of the battery case 130 of the battery cell 100, the risk of creating a residue between the battery cells 100 during the removal work may be significantly reduced.

Further, in this embodiment, when the adhesive member 300 is removed, it may be hardly required to use a separate remover or the like in order to remove the adhesive applied to the battery cell 100, and the risk of damage to the battery cells 100 may also be minimized.

As a result, the battery module 10 according to this embodiment may significantly improve both the assembly process efficiency according to the manufacture of the battery module 10 and the management efficiency of the battery module 10 in the future by means of the adhesive member 300.

Figure 7:
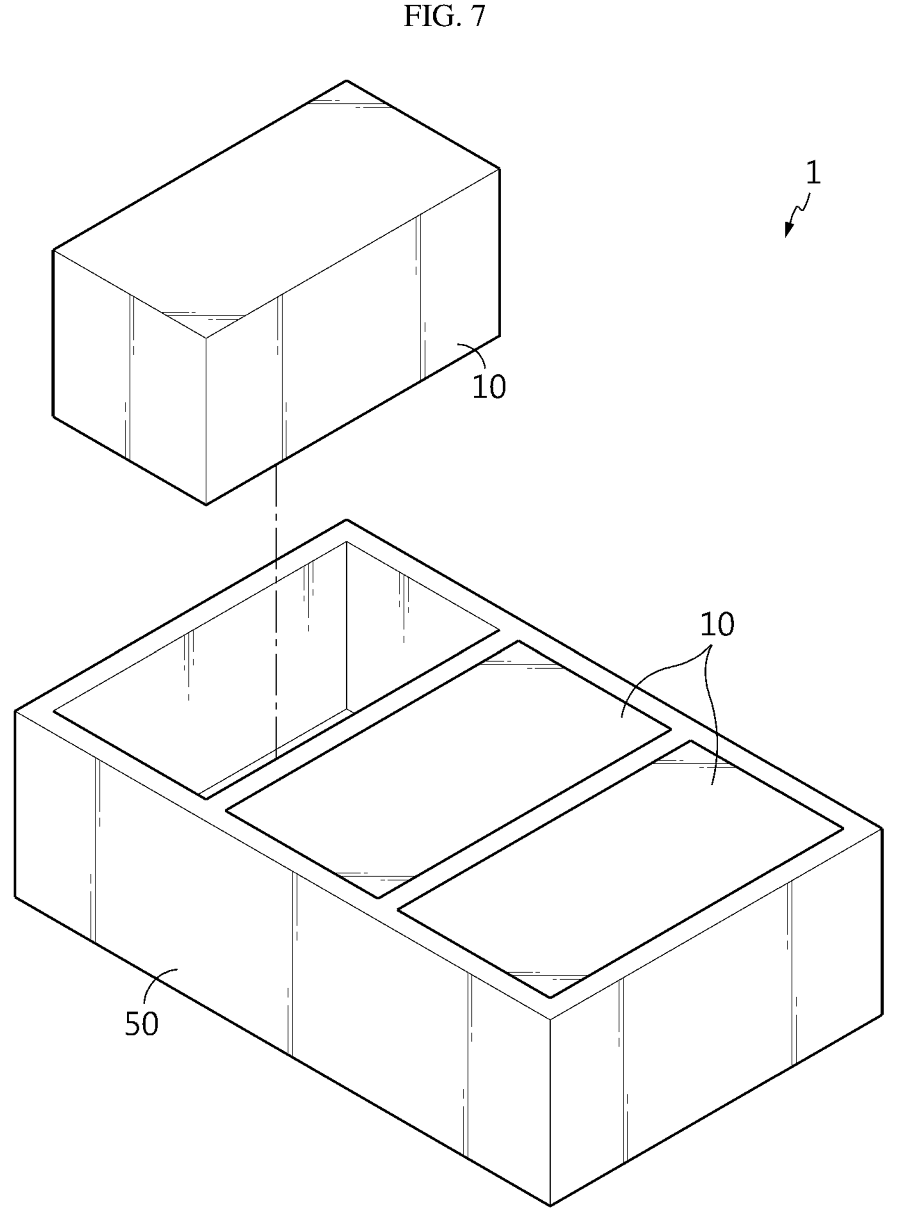
FIG. 7 is a diagram for illustrating a battery pack according to an embodiment of the present disclosure.
Figure 8:
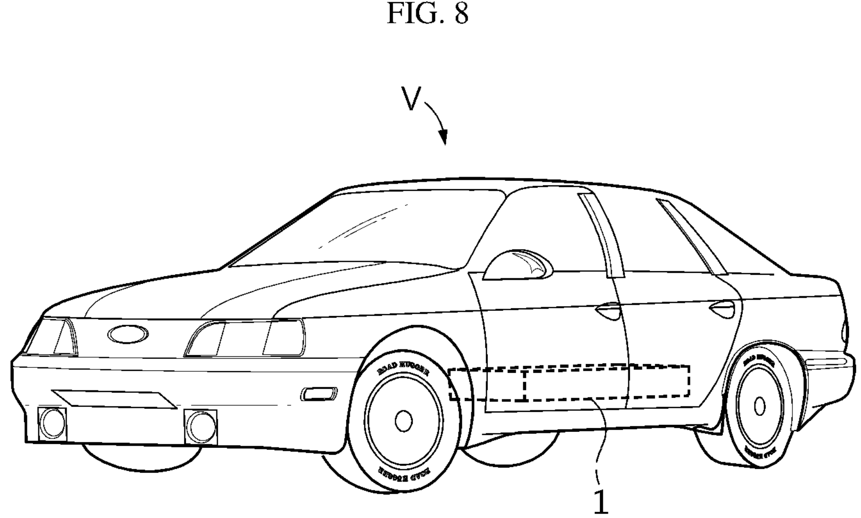
FIG. 8 is a diagram for illustrating a vehicle according to an embodiment of the present disclosure.

FIG. 7 is a diagram for illustrating a battery pack according to an embodiment of the present disclosure, and FIG. 8 is a diagram for illustrating a vehicle according to an embodiment of the present disclosure.

Referring to FIGS. 7 and 8, a battery pack 1 may include at least one battery module 10 and a pack case 50 for packaging the at least one battery module 10 according to the former embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle V, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as above, it is possible to provide a battery module 10 in which desired battery cells 100 may be separated more conveniently when it is required to replace at least some battery cells 100 among battery cells 100 stacked and fixed to each other, and a battery pack 1 and a vehicle V including the battery module 10.

In addition, according to various embodiments as above, it is possible to provide a battery module 10 in which locations of battery cells 100 stacked and fixed to each other may be easily changed or all battery cells 100 may be easily rearranged, and a battery pack 1 and a vehicle V including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:

a plurality of battery cells stacked on each other, each of the battery cells including a battery case having a case body accommodating an electrode assembly therein and a case terrace extending from an outer periphery of the case body along a longitudinal direction of the battery cells, the case terrace being thinner than the case body, each of the plurality of battery cells including a pair of electrode leads protruding from the case terrace at first and second opposite ends of the battery cell in the longitudinal direction and electrically connected to the electrode assembly; and a plurality of adhesive members respectively disposed between the plurality of battery cells and configured to be removable by a user manipulation without damaging the battery cases of the plurality of battery cells, wherein the adhesive members are disposed only at first and second opposite edges of the case body adjacent to the first and second opposite ends of the battery cells where the electrode leads protrude, and wherein each of the adhesive members includes an adhesion portion attached to the respective case body and a user manipulation portion extending from the adhesion portion in the longitudinal direction beyond the outer periphery of the case body between adjacent ones of the case terraces, wherein the user manipulation portion is spaced apart from the adjacent ones of the case terraces and is facing in a height direction of the battery module perpendicular to the longitudinal direction, wherein each of the plurality of adhesive members is removable from the case body by user manipulation in the longitudinal direction of the plurality of battery cells.

2. The battery module according to claim 1, wherein each of the plurality of adhesive members is configured to detach from the respective case body when slid along the longitudinal direction of the plurality of battery cells by the user manipulation.

3. The battery module according to claim 1, wherein the adhesion portion is a double-sided tape.

4. A battery pack, comprising:

at least one battery module each according to claim 1; and a pack case packaging the at least one battery module therein.

5. A vehicle, comprising:

at least one battery pack each according to claim 4.

* * * * *